United States Patent [19]

Gottesman et al.

[11] 3,901,837

[45] Aug. 26, 1975

[54] METAL SALT SOLUTIONS AND SURFACE-COATING COMPOSITIONS CONTAINING SAME

[75] Inventors: Roy T. Gottesman, Glen Rock; George M. Kagan, Edison; Joseph Fath, Princeton, all of N.J.

[73] Assignee: Tenneco Chemicals, Inc., Saddle Brook, N.J.

[22] Filed: Jan. 21, 1974

[21] Appl. No.: 435,075

[52] U.S. Cl.................. 260/22 R; 260/24; 260/25; 260/33.6 R; 106/264; 106/265
[51] Int. Cl.².......................................... C08L 91/00
[58] Field of Search.......... 260/22 R, 33.6; 106/264, 106/265, 310

[56] References Cited
UNITED STATES PATENTS

| | | | |
|---|---|---|---|
| 3,005,789 | 10/1961 | Bloom............................. | 260/22 R |
| 3,124,475 | 3/1964 | Fischer et al. ................. | 106/265 X |
| 3,329,634 | 7/1967 | McWhorter et al. ............ | 260/22 R |
| 3,425,975 | 2/1969 | Barrett............................ | 260/22 R |
| 3,547,846 | 12/1970 | Coulter ........................ | 260/22 R X |

OTHER PUBLICATIONS

Payne, Organic Coating Technology, Vol. I, John Wiley & Sons, Inc., 1954, pp. 232–237.
Singer, Fundamentals of Paint, Varnish, and Lacquer Technology, The American Paint Journal Co., 1957, pp. 47–51.

*Primary Examiner*—Lewis T. Jacobs
*Attorney, Agent, or Firm*—Evelyn Berlow

[57] ABSTRACT

Surface-coating compositions that comprise an oxidizable organic film-forming resinous vehicle contain from 2 to 5 percent, based on vehicle solids, of a loss-of-dry inhibitor which is a metal salt solution that contains 0.05 to 1.5 percent by weight of cobalt, 0.5 to 3.5 percent by weight of calcium, and 0.5 to 5.0 percent by weight of zinc or zirconium. The metals are present in the loss-of-dry inhibitor as salts of branched-chain aliphatic monocarboxylic acids having 6 to 14 carbon atoms, cycloaliphatic monocarboxylic acids having 6 to 10 carbon atoms, or mixtures of these acids.

18 Claims, No Drawings

METAL SALT SOLUTIONS AND SURFACE-COATING COMPOSITIONS CONTAINING SAME

This invention relates to metal salt solutions that are useful as loss-of-dry inhibitors in protective and decorative surface-coating compositions that contain an oxidizable organic vehicle. It further relates to surface-coating compositions that contain these loss-of-dry inhibitors.

Metal salts of organic acids have long been used in surface-coating compositions that contain drying oils and other oxidizable vehicles to accelerate the drying process and to promote the polymerization of the unsaturated oils to dry, mechanically resistant coatings. The metal salt driers perform efficiently when they are first incorporated into an oxidizable coating, but the coatings frequently exhibit a loss of drying rate on aging. This loss of drying rate probably results from the adsorption of the metal salts on the surfaces of the pigments and extenders in the coating or from the inactivation of the driers by the reaction of the soluble metal salts with acidic components of the coating system to form insoluble metal compounds, which do not function as driers.

The loss of drying rate that coating compositions undergo on storage can be inhibited or prevented by incorporating a loss-of-dry inhibitor in the coating. A number of loss-of-dry inhibitors have been proposed for use in oxidizable surface-coating compositions, but none has proven to be entirely satisfactory. For example, basic lead naphthenate has been widely used to prevent changes in the drying rate of surface-coating compositions on aging. The use of this loss-of-dry inhibitor has recently been restricted by legislation that drastically limits the amount of lead compounds that can be present in surface-coating compositions. Basic cobalt naphthenate is also an effective loss-of-dry inhibitor for oxidizable coating systems. Because it causes unacceptable staining in white and pastel coatings, this inhibitor can only be used in dark-colored coatings. Moreover, basic cobalt naphthenate often causes extensive wrinkling in paint films when it is used in the amounts that are necessary to give commercially acceptable drying times.

It has now been found that the loss of drying rate on aging of surface-coating compositions that contain oxidizable organic vehicles can be minimized or prevented by incorporating in the compositions certain solutions of metal salts. These solutions, which contain cobalt, calcium, and either zinc or zirconium salts, are at least as effective as the previously known loss-of-dry inhibitors. They do not, however, contain toxic metal salts, and they do not cause staining of white and pastel coatings at the levels at which they are used to inhibit loss of dry. Unlike the previously known loss-of-dry inhibitors which are pastes that must be ground into the coating compositions, the metal salt solutions of this invention are stable, free-flowing liquids that can be added to the coating compositions at any stage of their manufacture. In addition to serving as loss-of-dry inhibitor in surface-coating compositions that contain conventional metal salt driers, the metal salt solutions of this invention can be used as a combination drier-loss-of-dry inhibitor in compositions that do not contain metal salt driers.

The loss-of-dry inhibitors of this invention are solutions of oil-soluble metal salts that contain 0.05 to 1.5 percent by weight of cobalt, 0.5 to 3.5 percent by weight of calcium, and 0.5 to 5.0 percent by weight of either zinc or zirconium. The solutions that have the best combination of loss-of-dry inhibition, stability, and solubility characteristics contain 0.5 to 1.2 percent by weight of cobalt, 1.0 to 2.5 percent by weight of calcium, and 2.5 to 4.0 percent by weight of zinc or zirconium. The solutions that contain cobalt, calcium, and zinc salts are generally more effective as loss-of-dry inhibitors than those that contain cobalt, calcium, and zirconium salts.

The novel loss-of-dry inhibitors are solutions of oil-soluble metal salts of branched-chain aliphatic monocarboxylic acids having 6 to 14 carbon atoms, cycloaliphatic monocarboxylic acids having 6 to 10 carbon atoms, or mixtures of these acids. Illustrative of these acids are 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, isodecanoic acid, 2-ethyldecanoic acid, isotridecanoic acid, isotetradecanoic acid, cyclopentanoic acid, methylcyclopentanoic acid, cyclohexanoic acid, methylcyclohexanoic acid, 1,2-dimethylcyclohexanoic acid, cycloheptanoic acid, and the like. The preferred acids for use in the preparation of the metal salts are the branched-chain aliphatic monocarboxylic acids having 8 to 10 carbon atoms, such as 2-ethylhexanoic acid, isooctanoic acid, 2,2-diethylhexanoic acid, 2-methyl-2-ethylheptanoic acid, 2,2-dimethyloctanoic acid, 2-propylheptanoic acid, 3,5,5-trimethylhexanoic acid, 3-ethyloctanoic acid, isononanoic acid, and isodecanoic acid; naphthenic acids, such as cyclopentanoic acid, cyclohexanoic acid, cycloheptanoic acid, and methylcyclohexanoic acid; and mixtures of two or more of these acids. Among the most stable of the metal salt solutions are those that contain cobalt as cobalt 2-ethylhexoate and/or cobalt isononanoate, calcium as calcium naphthenate, and zinc as zinc 2-ethylhexoate.

The metal salts are added to surface-coating compositions as solutions of the salts in an inert non-polar organic solvent. The solvent is preferably a hydrocarbon or a halogenated hydrocarbon. The preferred solvents include aliphatic and cycloaliphatic hydrocarbons such as hexane, heptane, octane, isooctane, cyclohexane, and cycloheptane; petroleum distillates such as mineral spirits, gasoline, diesel fuel, and fuel oils; aromatic hydrocarbons such as benzene, toluene, xylene, and ethylbenzene; and chlorinated compounds such as chlorobenzenes, carbon tetrachloride, and ethylene dichloride. Particularly preferred as the solvent in the loss-of-dry inhibitors is mineral spirits that is not photochemically reactive as defined in Section (k) of Rule 66 of the County of Los Angeles Air Pollution Control District and that has a distillation range of about 150° to 200°C.

The metal salt solutions may contain an additive that decreases their viscosities. Such additives include the alkyl acid phosphates described in U.S. Pat. No. 2,456,824 and the polyoxyalkylene glycols described in U.S. Pat. No. 2,807,553.

The metal salt solutions may be prepared by any suitable and convenient procedure. They may be prepared by a fusion process in which the oxides or hydroxides of the metals are reacted with the organic acids in an organic solvent, or they may be prepared by a precipitaon process in which the sodium salts of the acids are reacted in aqueous solution with water-soluble salts of the metals, and the precipitated metal salts are separated from the aqueous solution and then dissolved in the organic solvent. It is generally preferred that the solutions be prepared by dissolving the appropriate amounts of the metal salts in the organic solvent.

The metal salt solutions of this invention can be used to inhibit the loss of drying rate of a wide variety of surface-coating compositions including paints, varnishes, enamels, printing inks, and the like that contain an oxidizable organic film-forming resinous vehicle. The vehicle may be a drying oil or semi-drying oil, such as linseed oil, soybean oil, tung oil, or dehydrated castor oil, either in the raw, blown, or heat-bodied form. Alternatively, the vehicle may be an alkyd resin, which is the product of the reaction of a polyhydric alcohol such as pentaerythritol or glycerol with a dicarboxylic acid such as phthalic anhydride or isophthalic acid and a monocarboxylic acid such as soybean oil fatty acids or linseed oil fatty acids, or an oleoresinous varnish, which is the product of the reaction of one of the aforementioned drying oils or semi-drying oils with rosin, a modified rosin, or a phenolic resin.

The surface-coating compositions to which the loss-of-dry inhibitors are added preferably contain conventional metal salt driers. Among the most widely used of these driers are the lead, cobalt, manganese, calcium, and zinc salts of naphthenic acids, octanoic acids, nonanoic acids, and tall oil acids. The metal salt solutions can also be used as combination drier-loss-of-dry inhibitor in compositions that do not contain metal salt driers.

In addition to the oxidizable organic film-forming resinous vehicle, loss-of-dry inhibitor, and metal salt driers, the surface-coating compositions of this invention may contain pigments, extenders, solvents, plasticizers, antiskinning agents, and other additives in the amounts ordinarily used in such compositions. Illustrative of the pigments that are used in surface-coating compositions are titanium dioxide, ferric oxide, calcium oxide, zinc oxide, antimony trioxide, kaolin, china clay, calcium carbonate, silica, talc, zinc chromate, carbon black, and mixtures thereof. The useful solvents include benzene, toluene, xylene, naphtha, mineral spirits, hexane, isooctane, and petroleum ether as well as water for water-based surface-coating compositions.

The invention is further illustrated by the following examples.

EXAMPLE 1

A metal salt solution was prepared by mixing together the following materials:

|  | Parts by Weight | % Metal |
|---|---|---|
| Cobalt 2-ethylhexoate (12% Co) | 45.88 | 0.551 |
| Cobalt isononanoate (12% Co) | 4.12 | 0.049 |
| Calcium naphthenate (4% Ca) | 525.00 | 2.100 |
| Zinc 2-ethylhexoate (18% Zn) | 178.00 | 3.204 |
| Mineral spirits (Distillation range — 157°C.–192°C.) | 232.00 | — |
| Tripropylene glycol | 15.00 | — |

The resulting solution was a free-flowing liquid. It showed excellent stability when stored at −25°C., 25°C., or 49°C. for 5 months.

EXAMPLE 2

A metal salt solution was prepared by mixing together the following materials:

|  | Parts by Weight | % Metal |
|---|---|---|
| Cobalt 2-ethylhexoate (12% Co) | 45.88 | 0.551 |
| Cobalt isononanoate (12% Co) | 4.12 | 0.049 |
| Calcium 2-ethylhexoate (6% Ca) | 483.00 | 1.932 |
| Calcium isononanoate (6% Ca) | 42.00 | 0.168 |
| Zinc 2-ethylhexoate (16% Zn) | 163.76 | 2.948 |
| Zinc isononanoate (16% Zn) | 14.24 | 0.256 |
| Mineral spirits (Distillation range — 157°C.–192°C.) | 232.00 | — |
| Tripropylene glycol | 15.00 | — |

The resulting solution was a free-flowing liquid. It contained a very small amount of precipitate after it had been stored at 25°C. or 49°C. for 1 week.

EXAMPLE 3

A metal salt solution was prepared by mixing together the following materials:

|  | Parts by Weight | % Metal |
|---|---|---|
| Cobalt isononanoate (12% Co) | 8.24 | 0.098 |
| Cobalt 2-ethylhexanoate (12% Co) | 91.76 | 1.102 |
| Zinc isononanoate (16% Zn) | 14.24 | 0.256 |
| Zinc 2-ethylhexoate (16% Zn) | 163.76 | 2.948 |
| Calcium isononanoate (6% Ca) | 42.00 | 0.168 |
| Calcium 2-ethylhexoate (6% Ca) | 483.00 | 1.932 |
| Mineral spirits (Distillation range — 157°C.–192°C.) | 232.00 | — |
| Tripropylene glycol | 15.00 | — |

This solution, which was a free-flowing liquid, showed slight precipitation after it had been stored at 25°C. or 49°C. for 1 week.

EXAMPLE 4

A metal salt solution was prepared by mixing together the following materials:

|  | Parts by Weight | % Metal |
|---|---|---|
| Cobalt 2-ethylhexoate (12% Co) | 100 | 1.2 |
| Zinc 2-ethylhexoate (16% Zn) | 178 | 3.2 |
| Calcium 2-ethylhexoate (6% Ca) | 525 | 2.1 |
| Mineral spirits (Distillation range — 157°C.–192°C.) | 232 | — |
| Tripropylene glycol | 15 | — |

The resulting solution was a stable, free-flowing liquid.

EXAMPLE 5

A metal salt solution was prepared by mixing together the following materials:

|  | Parts by Weight | % Metal |
|---|---|---|
| Cobalt 2-ethylhexoate (12% Co) | 100 | 1.2 |
| Zirconium 2-ethylhexoate (18% Zr) | 178 | 3.2 |
| Calcium 2-ethylhexoate (6% Ca) | 525 | 2.1 |
| Mineral spirits (Distillation range — 157°C.–192°C.) | 232 | — |
| Tripropylene glycol | 15 | — |

The resulting solution was a stable, free-flowing liquid.

EXAMPLE 6 a. A white enamel was prepared by grinding together the following materials on a pebble mill:

|  | Parts by Weight |
|---|---|
| Titanium dioxide (rutile) | 75.0 |
| Zinc oxide | 7.5 |
| Long oil soybean oil — phthalic anhydride alkyd resin (Aroplaz 1241-70) | 120.0 |
| Mineral spirits | 24.0 | b. To portions of the white enamel was added either (i) 5 percent, based on the weight of vehicle solids, of the metal salt solution of Example 1, (ii) a control drier system containing 0.06 percent, based on the weight of vehicle solids, of cobalt as cobalt 2-ethylhexoate and cobalt isononanoate and 0.12 percent, based on the weight of vehicle solids, of zirconium as zirconium 2-ethylhexoate and zirconium isononanoate, or (iii) 0.3 percent, based on the weight of vehicle solids, of a commercially-available loss-of-dry inhibitor that contains basic cobalt naphthenate (Cobalt 254) plus the aforementioned control drier system containing cobalt and zirconium salts.

The metal salt solution of Example 1 and the control drier system were added to the enamel at the let-down stage. The basic cobalt naphthenate was ground into the enamel.

c. Films of the resulting enamels were dried overnight. The yellowness index and the reflectance of each of the films were measured on 1.5 mil films with a Hunter Model D–25 Color and Color Difference Meter after the films had dried overnight and after they had aged for 3 weeks at 25°C. The results obtained are summarized in Table I.

Table I

| Driers in Enamel | Metal Salt Solution of Ex. 1 | Control Drier System (cobalt and zirconium salts) | Basic Cobalt Naphthenate plus Control Drier System (cobalt and zirconium salts) |
|---|---|---|---|
| Yellowness Index* | | | |
| Initial | 3.2 | 3.2 | 3.6 |
| Aged | 4.0 | 3.8 | 5.3 |
| Reflectance (Whiteness) %** | | | |
| Initial | 95.8 | 96.0 | 94.6 |
| Aged | 97.2 | 97.4 | 93.4 |

*Higher readings indicate greater yellowness
**Lower readings indicate more grayness The data in Table I demonstrate that the enamel containing the metal salt solution of Example 1 showed a color response comparable to that of the control enamel that contained the cobalt and zirconium salts and that both of these enamels were significantly less discolored than that containing basic cobalt naphthenate.

EXAMPLE 7

To portions of the white enamel whose preparation is decribed in Example 6a was added 0.16 percent by weight of an antiskinning agent (Exkin 2) and either (i) the metal salt solution of Example 4, (ii) the metal salt solution of Example 5, (iii) a drier system that provided 0.048 percent of cobalt as cobalt naphthenate and 0.48 percent of lead as lead naphthenate, based on the weight of vehicle solids, or (iv) a commercially available loss-of-dry inhibitor containing basic cobalt naphthenate plus the aforementioned drier system containing cobalt and lead salts. The amounts of the metal salts added are shown in Table II.

The drying times of films of the freshly-prepared and aged enamels were measured on 2 mil wet films at 25°C. and 50 percent relative humidity using Improved Gardner Circular Dry Time Recorders. The results obtained are given in Table II.

EXAMPLE 8 a. A red enamel that is prone to loss-of-drying rate on aging was prepared by grinding the following materials together on a pebble mill:

|  | Parts by Weight |
|---|---|
| Toluidine red pigment (Imperial X2741) | 18.75 |
| Long oil soybean oil — phthalic anhydride alkyd resin (Aroplaz 1241-70) | 109.75 |
| Mineral spirits | 62.50 |
| Antiskinning agent (Exkin 2) | 0.25 | b. To portions of the red enamel was added either (i) 5 percent, based on the weight of vehicle solids, of the metal salt solution of Example 3 or (ii) a conventional drier system containing 0.06 percent of cobalt as cobalt 2-ethylhexoate and cobalt isononanoate and 0.12 percent of zirconium as zirconium 2-ethylhexoate and zirconium isononanoate, the percentages being the percentages of metal based on the weight of vehicle solids.

Table II

|  | Enamel Containing Metal Salt Solution of Ex. 4 | | Enamel Containing Metal Salt Solution of Ex. 5 | | Enamel Containing Basic Cobalt Naphthenate | Enamel Containing No Loss-of-Dry Inhibitor |
| --- | --- | --- | --- | --- | --- | --- |
| % Loss-of Dry Inhibitor (based on vehicle solids) | 4% | 5% | 4% | 5% | 0.25% | None |
| Drying Time (Hours:Minutes) Initial | | | | | | |
| Set-to-touch | 0:40 | 0:40 | 0:40 | 0:40 | 0:35 | 0:35 |
| Dust-free | 1:40 | 1:55 | 1:40 | 1:40 | 1:50 | 2:15 |
| Thru dry | 3:35 | 3:30 | 3:40 | 3:30 | 3:20 | 3:45 |
| After Aging at 49°C. for 2 Months | | | | | | |
| Set-to-touch | 1:05 | 0:50 | 1:00 | 0:40 | 0:40 | 0:40 |
| Dust-free | 2:45 | 2:15 | 2:30 | 2:20 | 2:15 | 2:30 |
| Thru dry | 7:15 | 6:10 | 6:30 | 6:10 | 10:00 | 10:00 |

The drying times of films of the freshly prepared and aged enamels were measured by the procedure described in Example 7. The results obtained are given in Table III.

Table III

|  | Enamel Containing Metal Salt Solution of Ex. 3 | Enamel Containing Conventional Drier System |
| --- | --- | --- |
| Total Metal Content (% based on wt. of vehicle solids) | 0.325 | 0.334 |
| Drying Time (Hours:Minutes) Initial | | |
| Set-to-touch | 1:20 | 3:00 |
| Dust-free | 4:15 | 5:00 |
| Thru-dry | 7:00 | 12:45 |
| After Aging at 49°C. for 2 Months | | |
| Set to-touch | 1:40 | >24:00 |
| Dust-free | 4:30 | >24:00 |
| Thru dry | 7:30 | >24:00 |

The data in Table III show that the enamel containing the metal salt solution of Example 3 showed little loss-of-dry on accelerated aging, whereas the enamel containing the conventional drier system showed considerable loss-of-dry.

EXAMPLE 9 a. A black enamel that is prone to loss-of-dry on aging with conventional driers was prepared by grinding together in a ball mill the following materials:

|  | Parts by Weight |
| --- | --- |
| Carbon black | 113.50 |
| Medium oil linseed oil — phthalic anhydride alkyd (Cargil A-3) | 2764.86 |
| Mineral spirits | 599.28 |
| Antiskinning agent (Exkin 2) | 6.96 |

This enamel contained 39.75 percent vehicle solids.

To this enamel was added an amount of a conventional drier system that provided 0.05 percent cobalt, 0.20 percent zirconium, and 0.03 percent calcium, the percentages being the percentage of metal based on the weight of vehicle solids.

b. To portions of the black enamel of Example 9a was added either (i) 3 percent, based on the weight of vehicle solids, of the metal salt solution of Example 1 or (ii) 2.5 percent, based on the weight of vehicle solids, of a commercially available loss-of-dry inhibitor that contains basic lead naphthenate and that is marketed as Nuact.

c. The drying times of films of the freshly prepared and aged enamels of Example 9b and of the enamel of Example 9a were determined by the procedure described in Example 7. The results obtained are given in Table IV.

The results in Table IV demonstrate that the metal salt solution of Example 1 was more effective than the lead-based comparator as a loss-of-dry inhibitor in the black enamel.

Table IV

|  | Enamel Containing Driers and Metal Salt Solution of Ex. 1 | Enamel Containing Driers and Basic Lead Naphthenate | Enamel Containing Driers, but no Loss-of-Dry Inhibitor |
| --- | --- | --- | --- |
| Drying Time (Hours:Minutes) Initial | | | |
| Set-to-touch | 1:25 | 1:15 | 1:20 |
| Dust-free | 1:30 | 1:15 | 1:20 |
| Thru dry | 3:10 | 2:35 | 3:45 |
| After aging at 49°C. for 2 Months | | | |
| Set-to-touch | 1:00 | 1:00 | 1:25 |
| Dust-free | 2:20 | 2:20 | 7:15 |
| Thru dry | 3:50 | 4:25 | 10:30 |

EXAMPLE 10 a. To the red enamel whose preparation is described in Example 8a was added an amount of a drier system that provided 0.052 percent of cobalt, 0.29 percent of zirconium, and 0.018 percent of calcium, the percentages being the percent of metal based on vehicle solids.

b. To portions of this enamel was added either (i) 2 percent, based on the weight of vehicle solids, of the metal salt solution of Example 2 or (ii) 2.5 percent, based on the weight of vehicle solids, of a commercially available loss-of-dry inhibitor containing basic lead naphthenate (Nuact).

c. The drying times of films of the freshly prepared and aged enamels of Example 10a and the enamel of Example 8a were determined by the procedure described in Example 7. The results obtained are given in Table V.

The data in Table V show that the metal salt solution of Example 2 was equivalent to the lead-based comparator as a loss-of-dry inhibitor in the red enamel.

Table V

|  | Enamel Containing Metal Salt Solution of Ex. 2 | Enamel Containing Basic Lead Naphthenate | Enamel Containing No Loss-of Dry Inhibitor |
|---|---|---|---|
| Drying Time (Hours:Minutes) Initial |  |  |  |
| Set-to-touch | 3:50 | 4:45 | 5:00 |
| Dust-free | 5:15 | 6:15 | 6:15 |
| Thru dry | 6:50 | 7:20 | 7:30 |
| After Aging at 49°C. for 2 Months |  |  |  |
| Set-to-touch | 3:40 | 5:10 | 6:15 |
| Dust-free | 5:35 | 6:20 | 8:40 |
| Thru dry | 7:05 | 7:15 | 10:00 |

What is claimed is:

1. A surface-coating composition having improved resistance to loss of drying rate on aging that comprises an oxidizable, organic, film-forming resinous vehicle and from 2 to 5 percent, based on the weight of the vehicle, of a loss-of-dry inhibitor, said loss-of-dry inhibitor being a metal salt solution that contains 0.05 to 1.5 percent by weight of cobalt, 0.5 to 3.5 percent by weight of calcium, and 0.5 to 5.0 percent by weight of zinc or zirconium, the cobalt, calcium, zinc, and zirconium being present as salts of acids selected from the group consisting of branched-chain aliphatic monocarboxylic acids having 6 to 14 carbon atoms, cycloaliphatic monocarboxylic acids having 6 to 10 carbon atoms, and mixtures thereof.

2. A surface-coating composition according to claim 1 wherein the metal salt solution contains 0.5 to 1.2 percent by weight of cobalt, 1.0 to 2.5 percent by weight of calcium, and 2.5 to 4.0 percent by weight of zinc or zirconium.

3. A surface-coating composition according to claim 1 wherein the cobalt, calcium, zinc, and zirconium are present in the solution as salts of acids selected from the group consisting of branched-chain aliphatic monocarboxylic acids having 8 to 10 carbon atoms, naphthenic acid, and mixtures thereof.

4. A surface-coating composition according to claim 1 wherein the oxidizable vehicle is an alkyd resin.

5. A surface-coating composition according to claim 1 that additionally contains metal salt driers.

6. A surface-coating composition having improved resistance to loss of drying rate on aging that comprises an oxidizable, organic, film-forming resinous vehicle, metal salt driers, at least one pigment, and from 2 to 5 percent, based on the weight of the vehicle, of a loss-of-dry inhibitor, said loss-of-dry inhibitor being a metal salt solution that contains 0.05 to 1.5 percent by weight of cobalt, 0.5 to 3.5 percent by weight of calcium, and 0.5 to 5.0 percent by weight of zinc or zirconium, the cobalt, calcium, zinc, and zirconium being present as salts of acids selected from the group consisting of branched-chain aliphatic monocarboxylic acids having 6 to 14 carbon atoms, cycloaliphatic monocarboxylic acids having 6 to 10 carbon atoms, and mixtures thereof.

7. A surface-coating composition according to claim 6 wherein the oxidizable vehicle is an alkyd resin.

8. A surface-coating composition according to claim 6 wherein the loss-of-dry inhibitor comprises a mixture of said metal salts in an inert non-polar organic solvent.

9. A surface-coating composition according to claim 8 wherein the inert non-polar organic solvent is a hydrocarbon solvent.

10. A surface-coating composition according to claim 8 wherein the inert non-polar organic solvent is mineral spirits.

11. A surface-coating composition according to claim 6 wherein the loss-of-dry inhibitor comprises metal salts of acids selected from the group consisting of branched-chain aliphatic monocarboxylic acids having 8 to 10 carbon atoms, naphthenic acid, and mixtures thereof.

12. A surface-coating composition according to claim 6 wherein the loss-of-dry inhibitor comprises a solution in a hydrocarbon solvent of a mixture of metal salts, said solution containing 0.5 to 1.2 percent by weight of cobalt as cobalt 2-ethylhexoate and cobalt isononanoate, 1.0 to 2.5 percent by weight of calcium as calcium naphthenate, and 2.5 to 4.0 percent by weight of zinc as zinc 2-ethylhexoate.

13. In a surface-coating composition that undergoes loss of drying rate on aging and that comprises an oxidizable, organic, film-forming resinous vehicle, metal salt driers, and at least one pigment, the improvement that inhibits loss of drying rate on aging and that consists of incorporating in the surface-coating composition from 2 to 5 percent, based on the weight of the vehicle of a loss-of-dry inhibitor, said loss-of-dry inhibitor being a solution of metal salts in an inert non-polar organic solvent and containing 0.05 to 1.5 percent by weight of cobalt, 0.5 to 3.5 percent by weight of calcium, and 0.5 to 5.0 percent by weight of zinc or zirconium, said cobalt, calcium, zinc, and zirconium being present as salts of acids selected from the group consisting of branched-chain aliphatic monocarboxylic acids having 6 to 14 carbon atoms, cycloaliphatic monocarboxylic acids having 6 to 10 carbon atoms, and mixtures thereof.

14. The method of claim 13 wherein the loss-of-dry inhibitor contains 0.5 to 1.2 percent by weight of cobalt, 1.0 to 2.5 percent by weight of calcium, and 2.5 to 4.0 percent by weight of zinc or zirconium.

15. The method of claim 13 wherein the loss-of-dry inhibitor comprises a solution of salts of acids selected from the group consisting of branched-chain aliphatic nonocarboxylic acids having 8 to 10 carbon atoms, naphthenic acid, and mixtures thereof.

16. The method of claim 13 wherein the loss-of-dry inhibitor contains 0.5 to 1.2 percent by weight of cobalt as cobalt 2-ethylhexoate and cobalt isononanoate, 1.0 to 2.5 percent by weight of calcium as calcium naphthenate, and 2.5 to 4.0 percent by weight of zinc as zinc 2-ethylhexoate.

17. The method of claim 13 wherein the loss-of-dry inhibitor comprises a solution of metal salts in a hydrocarbon solvent.

18. The method of claim 13 wherein the loss-of-dry inhibitor comprises a solution of metal salts in mineral spirits.

* * * * *